United States Patent [19]

Cofer

[11] Patent Number: 5,048,406
[45] Date of Patent: Sep. 17, 1991

[54] DISPOSABLE/REFILLABLE SMOKE CARTRIDGE FOR GAS BARBECUE GRILLS

[76] Inventor: Joseph R. Cofer, Rte. 3, Box 6075, Sweetwater, Tenn. 37874

[21] Appl. No.: 517,832

[22] Filed: May 2, 1990

[51] Int. Cl.$^5$ .......................... A23L 1/01; A23B 4/04
[52] U.S. Cl. ...................................... 99/482; 99/467; 127/25 R; 127/59.5; 206/524.6; 206/525
[58] Field of Search ................. 99/467, 482, 483, 399, 99/340, 446, 516, 480; 426/235, 314, 315; 126/25 R, 25 A, 59.5, 79; 131/329, 330, 185, 200; 110/108, 102, 118, 196; 206/525, 524.6

[56] References Cited

U.S. PATENT DOCUMENTS

| | | | |
|---|---|---|---|
| D. 283,588 | 4/1986 | Stuckey | D7/332 |
| 2,967,023 | 1/1961 | Huckabee | 99/482 |
| 3,788,301 | 1/1974 | Terry | 126/59.5 |
| 4,140,049 | 2/1979 | Stewart | 99/483 |
| 4,190,677 | 2/1980 | Robins | 99/482 |
| 4,374,489 | 2/1983 | Robbins | 99/482 |
| 4,436,100 | 3/1984 | Green, Jr. | 131/330 |
| 4,779,525 | 10/1988 | Gaines | 99/482 |
| 4,934,272 | 6/1990 | Sternin et al. | 99/482 |

Primary Examiner—Timothy F. Simone
Attorney, Agent, or Firm—Pitts & Brittian

[57] ABSTRACT

A single-unit, ready-to-use device for flavoring food by smoking on a barbecue grill using gas or other fuels. This invention is a small, convenient cartridge containing small pieces of one of the aromatic woods, such as Hickory or Mesquite, etc., or any combination thereof. The package can contain draft vent perforations to allow enough air to flow in to promote charring without allowing ignition, and smoke to flow directably out. In use, the package is placed directly on the gas-heated lava rocks, burning charcoal, or other fuel. The wood chips within the package quickly begin to char and emit smoke, thus flavoring the food placed within the gas grill enclosure. When the process is complete, the cooled package can be easily disposed of along with the other household refuse, or it can be saved for recycling. Multiple cartridges can be made available in multi-cartridge carriers and more than one cartridge can be used simultaneously or sequentially. The cartridges can be refilled, if desired, to a limited degree.

20 Claims, 5 Drawing Sheets

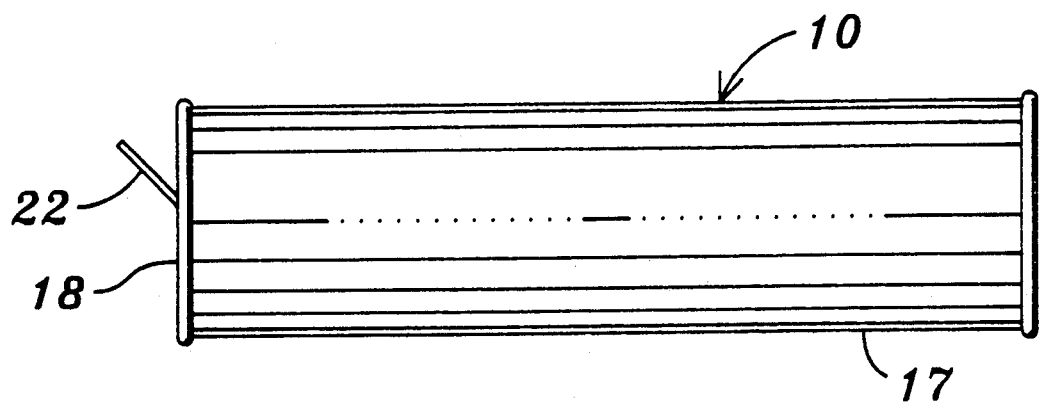
Fig. 1A
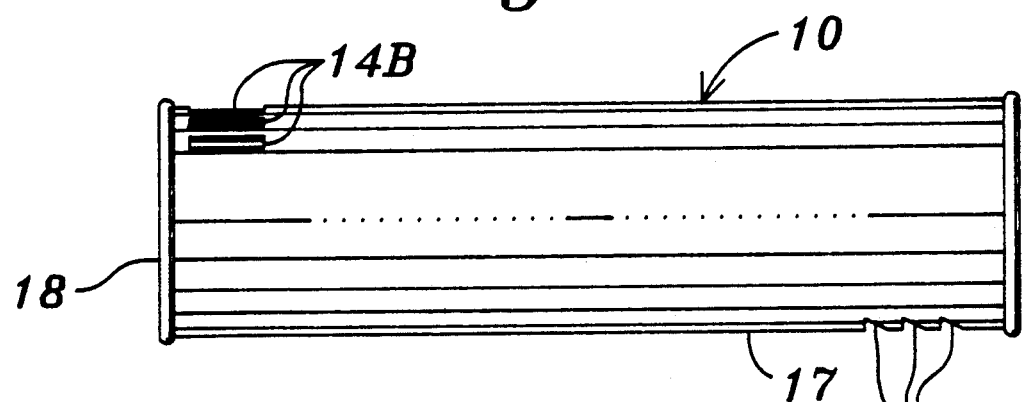
Fig. 1B
Fig. 1C
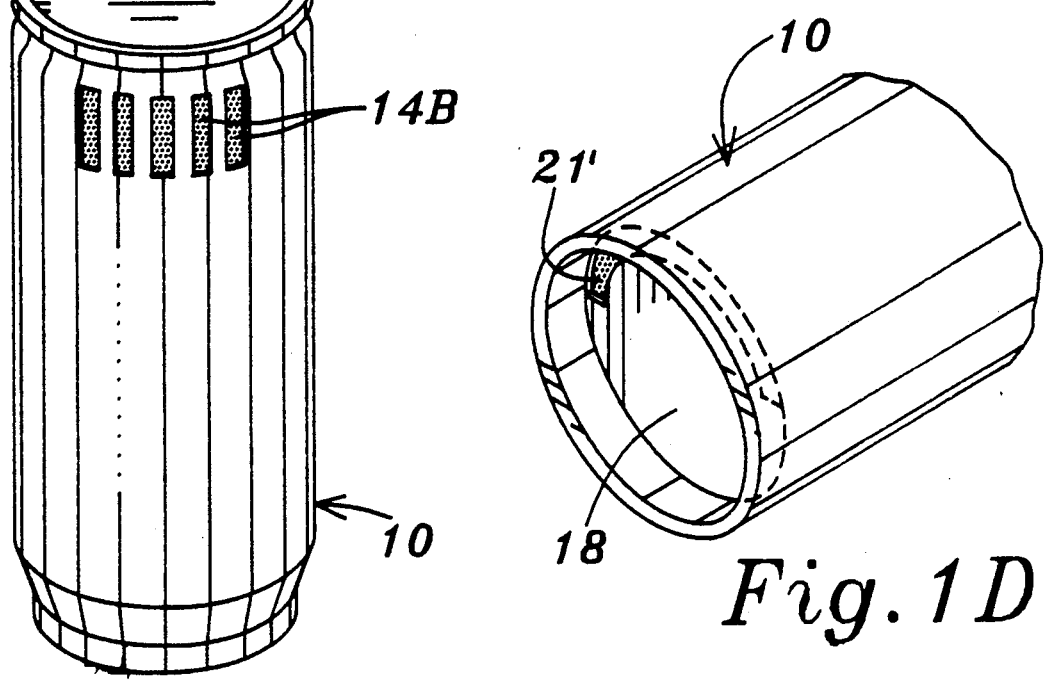
Fig. 1D

DISPOSABLE/REFILLABLE SMOKE CARTRIDGE FOR GAS BARBECUE GRILLS

TECHNICAL FIELD

This invention relates to a device for generating aromatic smoke for the flavoring of food therewith, and more particularly concerns a ready-to-use cartridge containing any of a variety of organic materials known and preferred for their ability to pleasantly flavor food by the smoke they emit.

BACKGROUND ART

The practice of flavoring and preserving food by smoking is a well-known and often-performed process. Several methods and devices have been utilized over the years in accomplishing this task. Known prior art includes U.S. Pat. Nos. 2,967,023, T. T. Huckabee; 4,140,049, William G. Stewart; 4,190,677, John S. Robins; 4,374,489, Jack Robbins; and U.S. Pat. No. Des. 283,588, Charles W. Stuckey.

Huckabee, '023, differing from the teaching of the device of the present invention, teaches the practice of cooking the food to the degree desired before beginning the smoking process.

The patent granted to Stewart, '049, pertains to a method and apparatus for modifying an existing cooker so as to introduce extra moisture to reduce or eliminate drying.

The '677 patent granted to John Robins teaches the use of a bed of wood flour, which apparently must be obtained by the user, specified as being finely ground to a particular mesh, placed on a tray or similar mechanism, further specified as being out of direct contact with the heat producing fuel, and ignited. In contrast, the device of the present invention is specified as being placed in contact with the fuel and carefully kept from ignition, in addition to the novelty of being supplied in a special container, ready to drop in and use.

The food smoking adapter of Jack Robbins, '489, is a specially constructed device attachable to certain cooking grills only, and requires a source of electrical power to heat the smoke producing material.

The Design Patent assigned to Stuckey is simply an ornamental design for another holder of wood chips used in smoking food.

Thus, it can be seen that there is a need for a device which supplies pre-packaged food smoking material in a clean, ready-to-use, convenient, and easily disposed-of format.

Accordingly, it is an object of the present invention to provide a device for generating smoke for flavoring various foodstuffs.

It is another object of the present invention to provide such a foodsmoking device to be of a small size and light in weight for ease and convenience of handling and use.

It is yet another object of the present invention to provide such a foodsmoking device in a long, thin format and composed of thin walls of highly heat-conductive material so as to cause quick-starting, efficient charring of the smoke-producing organic material contained therein.

It is a still further object of the present invention to provide such a foodsmoking device in a clean, ready-to-use package which can be placed directly on the heat-producing material of the grill while not interfering with the normal operation of the various types of grills; such a device being easy to use and easy to dispose of after use, serving to contain not only the foodsmoking material fragments prior to use, but also the charred ashes remaining after use.

It is still a further object of the present invention to provide such a foodsmoking device in a variety of formats; i.e., the specific type of organic material contained in a particular device cartridge. Thus, some cartridges constructed in accordance with various features of the present invention would contain Hickory chips, some would contain Mesquite chips, etc., for instance, so as to provide a choice of flavoring material to the user.

It is also an object of the present invention to provide such a foodsmoking device in a format which permits the packaging of multiple units of the device in a convenient carrier, i.e., "six-packs," or "eight-packs," for instance.

These and other objects of the invention will become apparent from the following description taken in connection with the accompanying drawings, in which:

BRIEF DESCRIPTION OF THE DRAWINGS

FIGS. 1A and 1B illustrate side elevation views of two separate embodiments of the smoke cartridge of the present invention.

FIGS. 1C and 1D illustrate perspective views of two separate embodiments of the smoke cartridge of the present invention.

DISCLOSURE OF THE INVENTION

Figure 2A:
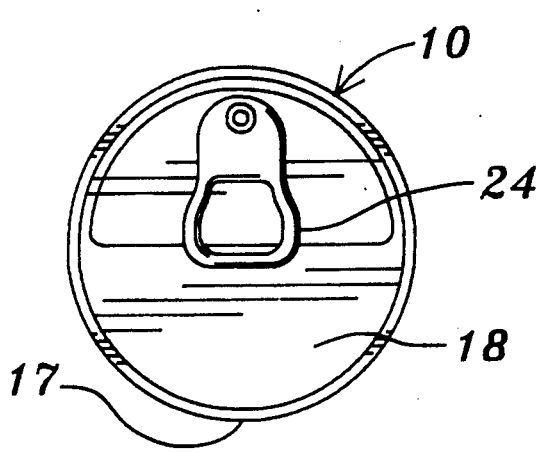
FIGS. 2A-E illustrate end views of five separate embodiments of the smoke cartridge of the present invention.

In accordance with various features of the present invention, a light-weight, disposable device for flavoring food by smoking during the cooking process is provided. In a preferred embodiment, this device is a cylindrical cartridge which contains fragments of organic material, such as chips of Hickory, Mesquite, or fruit wood, etc. One end of the cartridge can be partially opened by a pull-tab ring, such as those presently in use on cans of soft drinks.

For use, the cartridge is placed directly in or on the heat-producing material of a gas barbecue grill and aligned so as to place the end with the opening within one to two inches of the front center of the grill. In typically three to four minutes, the organic material, heated by the conduction of heat from the fuel of the barbecue grill through the cartridge walls, begins to char and emit smoke through the opening created by pulling the tab. After typically five to seven minutes, the smoke reaches its desired emission volume. An optional tilt adapter can be placed under the cartridge to facilitate raising the smoke emitting end slightly to increase the efficiency of emission.

In a typical embodiment, the food to be cooked and smoked is placed on a wire grill above the heat-producing material, and thus, above the smoke-producing cartridge also, with a cover placed over all so as to enclose the food, the heat, and the smoke within the apparatus for a period of time. This period of time will vary with the type of food involved and according to individual preference and experience, but it is during this time that the smoke producing material contained in the cartridge will impart its flavoring characteristic to the food enclosed therewith. It is a feature of the present invention that the smoke flavoring action is taking place simultaneously with the cooking of the food instead of in a separate process. the food instead of in a separate process.

Additional cartridges of the same or a different type of smoke producing material can be added (or removed) as desired. When the user is satisfied with the results obtained, the food is removed and eaten. The cartridge can be left in the grill, or removed immediately, if desired. Depending on the condition of the smoke-producing material, the charring process could be terminated and the cartridge saved for further use later. When the material contained in the cartridge has been consumed (and, of course, after it has cooled), the cartridge can be disposed of in the same manner as any other household refuse.

BEST MODE FOR CARRYING OUT THE INVENTION

Referring to the drawings, a single-unit, ready-to-use device for flavoring food by smoking, constructed in accordance with various features of the present invention, is illustrated generally at 10. Referring particularly to FIGS. 1A, 1B and 1C, the side views of three possible cylindrical cartridge 10 embodiments of such a device are shown. The cartridge 10 is typically constructed of mild steel with a coating of tin or other anti-rust treatment, although aluminum or similar materials can also be used. A preferred size for the cartridge is approximately six to seven inches in length and two and one-quarter inches in diameter. In the smoke emitting position, the device 10 rests on a bottom side 17, which can have perforations 14A for draft ventilation. One end 18 of cartridge 10 can be opened, indicated by flap 22 in FIG. 1A, to allow smoke to escape and envelop the food. Another method of opening an end 18 of cartridge 10 is indicated in FIG. 1B by the slotted perforations 14B which are shown on the top side of cartridge 10, rather than in end wall 18. This example is further illustrated in FIG. 1C. The embodiments shown in FIGS. 1B and 1C are designed for being used one time and discarded. In the strictly disposable embodiments shown in FIGS. 1B and 1C, the openings will be covered with some material such as a strip of tape prior to use.

In the preferred embodiment of opening the end 18 of cartridge 10, a pull tab ring such as 24, in FIG. 2A, similar to those in use on soda pop cans today, is provided. Many other methods of opening cartridge 10 for the emission of smoke are possible, such as the ones illustrated in FIGS. 2B through 2E, for example.

Figure 2B:
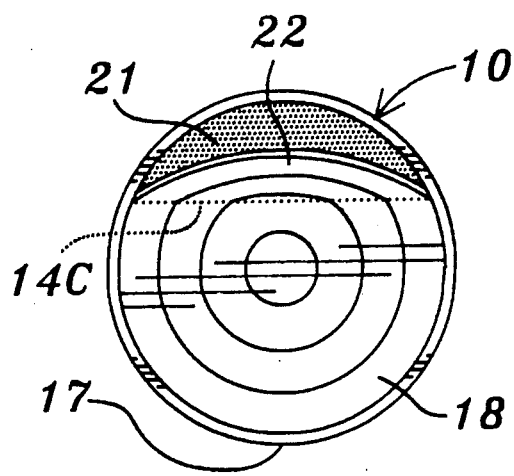
Figure 2C:
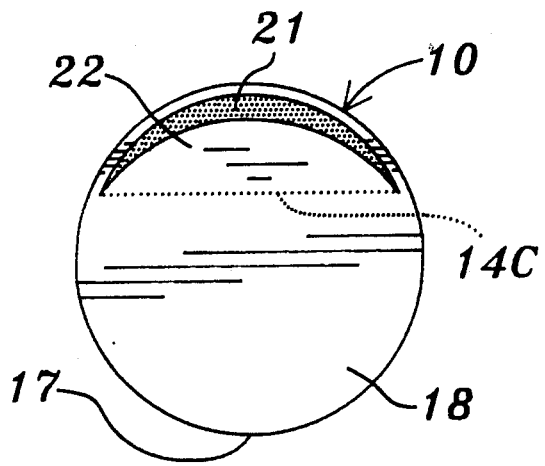
Figure 2D:
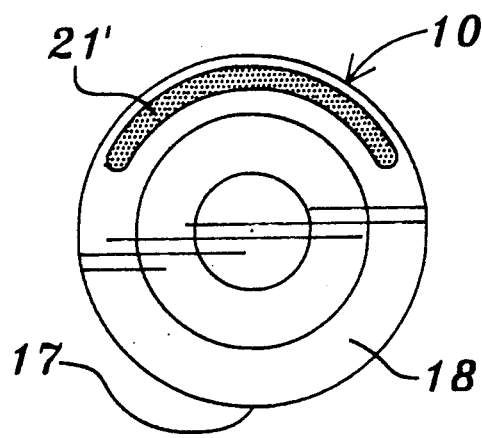
Figure 2E:
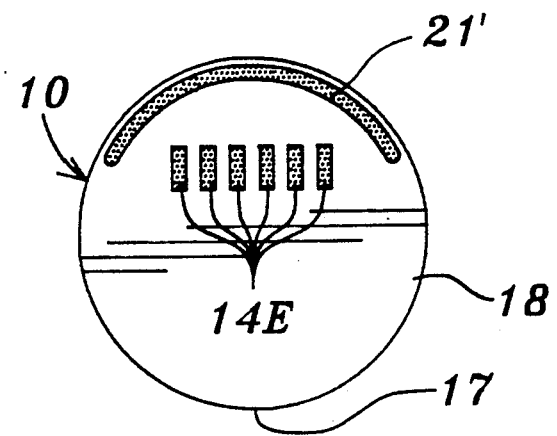

In FIGS. 2B and 2C, a row of small perforations 14C can be provided to delineate the size of the slot, or opening 21 created by the pulling of tab 22. In FIGS. 2D and 2E, slot 21' may be precut in the end 18 at the time of manufacture.

In contrast with some of the prior art, the cartridge 10 of the present invention can be virtually filled with organic material for smoking food. Its long, thin shape ensures that the heat is immediately applied to one end of the organic material contained therein and progresses quickly to the other end while deflecting excessive heat. The disposable embodiment of such a device is illustrated. However, also within the scope of the present invention is a reusable version, which could include the use of slightly heavier material and a re-attachable cap or cover.

Figure 3A:
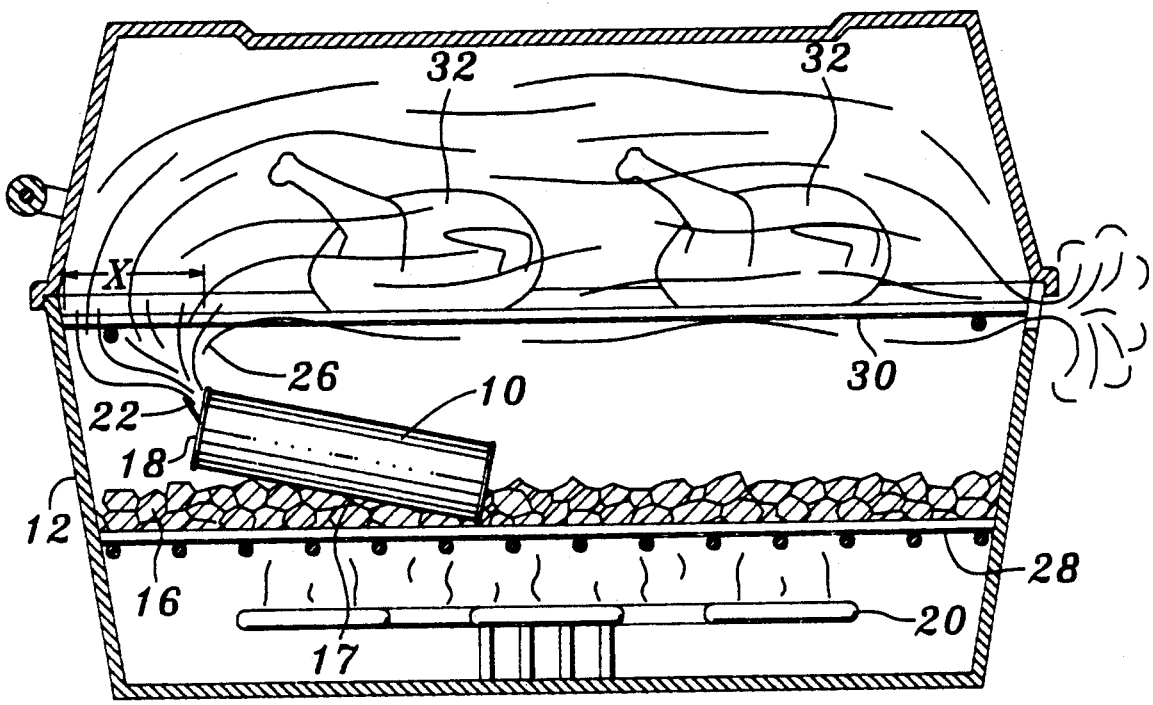
FIG. 3A illustrates an end view, partially in section, of a smoke cartridge of the present invention in place within a grill.

In a preferred embodiment, a food-smoking cartridge 10 is used in conjunction with a food-cooking device known as a gas barbecue grille 12, FIG. 3A, shown in section and as having a burner 20, heating lava rocks 16. However, it will be readily observed that a device of the present invention can be utilized with equal facility in grilles which use other fuels, such as charcoal, for instance.

In the illustrated embodiment, a bottom end 17 of cartridge 10 has been placed on grate 28, together with lava rocks 16. Heat from burner 20 heats lava rocks 16, cartridge 10, the organic material contained therein, and the food 32. The smoke emitting end 18 of cartridge 10 has been elevated, and is placed proximate the front center of grille 12 within the dimension indicated by X, which is, preferably, one to two inches.

Figure 3B:
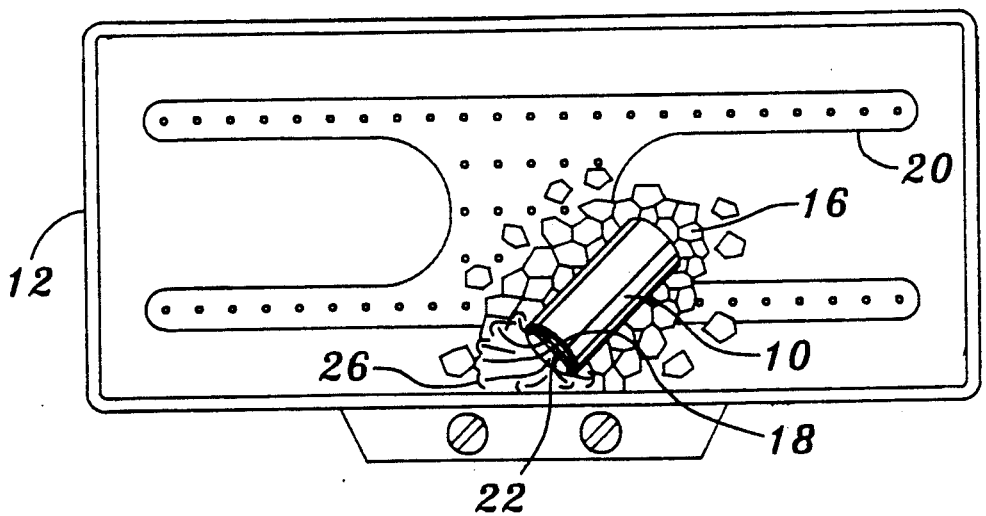
FIG. 3B illustrates a top view of a smoke cartridge of the present invention in place within a grill.

One end wall 18 of cartridge 10 has been partially opened and formed into a flap 22. Bottom side 17 of cartridge 10 is shown as having draft ventilation holes 14A. The organic material contained in cartridge 10 reacts to the effects of heat from burner 20 and the draft of 14A to 22 by charring and emitting smoke 26. Smoke 26 envelops food 32 suspended on grill rods 30 and, in doing so, imparts the desirable smoke flavoring to food 32 during the time that food 32 is being cooked, thus achieving the most flavorful results possible. FIG. 3B shows the optimum positioning of cartridge 10 in a top view of a cartridge 10 in a grille 12 with lava rocks 16 and burner 20. The end 18 emitting smoke 26 is at the front edge and center of grille 12 while the opposite end of cartridge 10 is over the hottest part of burner 20.

In use, the cartridge 10 is placed directly on the grate 28 supporting the lava rocks 16, with the open end 18 having tab 22 up and the ventilation openings 14A down. The bottom 17 of cartridge 10 can rest directly on grate 28 and the smoke emitting end 18 can rest on the lava rocks 16 or on an optional support 25, shown in FIGS. 4A and 4B. The open, smoke-emitting end 18 can be placed between one and a half and two inches from the front edge and at the center of the grille 12 as illustrated at X in FIG. 3A. This positioning provides for optimum dispersal of the flavoring smoke 26 around the food 32, forcing smoke to circulate the entire grilling area before escaping in the rear. All foods in grill are evenly smoked without having to place meats or food directly over smoke stream where it comes out of cartridge smoker. It is recommended that the end 18 of cartridge 10 which is emitting the smoke 26 be elevated as room permits above the other end to provide optimum emission of smoke.

In typically three to four minutes, the organic material within the cartridge 10 begins to smolder and char, emitting smoke 26 as it does so, usually reaching optimum volume within six or seven minutes. This effect should last for a period of from fifteen to twenty minutes, the actual time depending on several variables. Additional smoke cartridges 10 can be added, the air flow varied, the heat level changed, etc., to suit individual circumstances. Upon completion of the smoking operation, the cooled smoke cartridge 10 may be disposed of as desired the same as any other household refuse.

Other embodiments can include various other types of openings in cartridge 10, which is cylindrical in a preferred embodiment, but which can also take other forms and shapes, the optimum characteristics being long and slim. Some of the other styles of openings possible are illustrated in FIGS. 2A through 2E. FIGS. 2B and 2C are similar in that a portion of the end wall 18 has been made into a flap 22 and bent outward from the cartridge 10. FIGS. 2D and 2E illustrate a precut stationary slot opening 21', while FIG. 2E also shows the use of additional slots 14E for more drafting.

FIG. 2A illustrates the familiar pop-top ring 24 in place on one end wall of the device 10. FIG. 1C illustrates the device 10 standing on end to show some detail of another form of perforations 14B.

The embodiments shown in FIGS. 2A through 2E can include having the end wall 18 recessed into cartridge 10 as illustrated in FIG. 1D, in order to avoid having grease drip into cartridge 10, with the possibly resultant ignition of the smoke producing material.

Figure 4A:
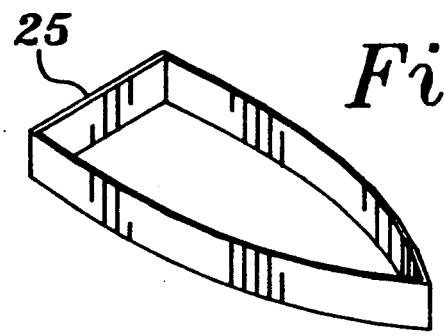
FIGS. 4A and 4B illustrate perspective and side elevation views, respectively, of the optional support adapter of a smoke cartridge of the present invention.
Figure 4B:
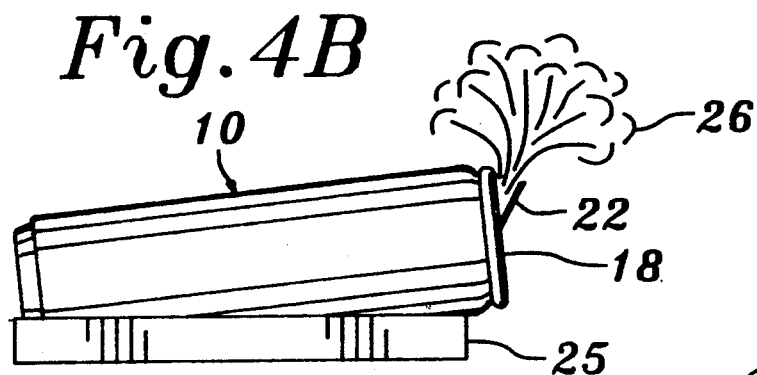
Figure 4C:
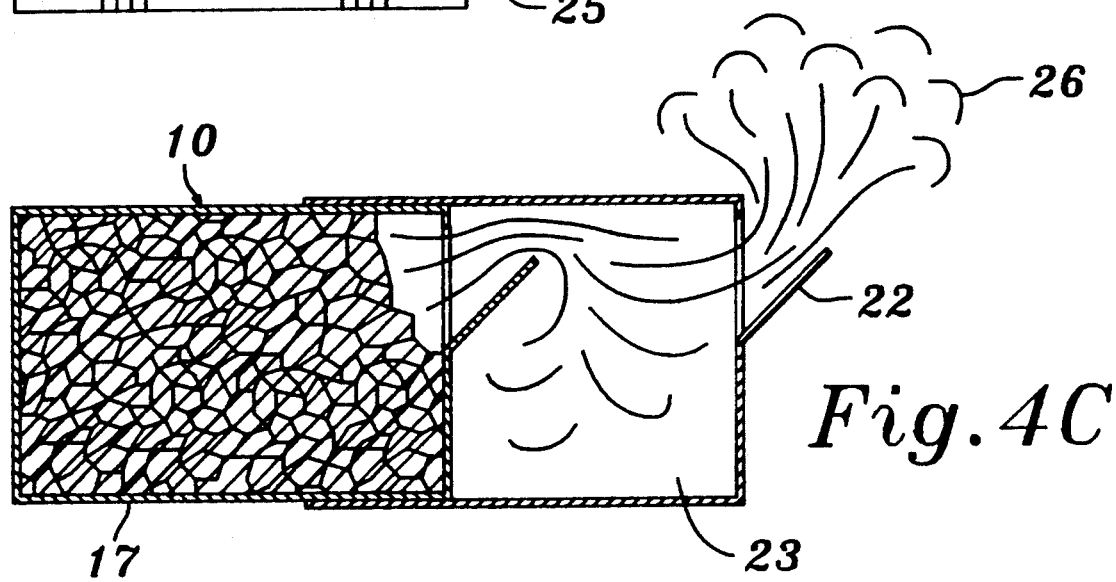
FIG. 4C illustrates a side elevation view, in section, of a smoke cartridge of the present invention with an optional extension tube of the present invention.

If an alternate, shorter embodiment of the present invention is used, or alternatively to a recessed end 18, an extension tube 23, FIG. 4C, can be provided as an integral part of cartridge 10, or as an optional separate device for transfer from one cartridge to another. Extension tube 23 is useful not only for shielding smoke emitting end 18 from dripping grease, but also to ensure that the base end of cartridge 10 reaches the hottest point of the heat while keeping the smoke emitting end 18 within the X distance from the front of grille 12. Normally, however, the extension will not be necessary.

Figure 4D:
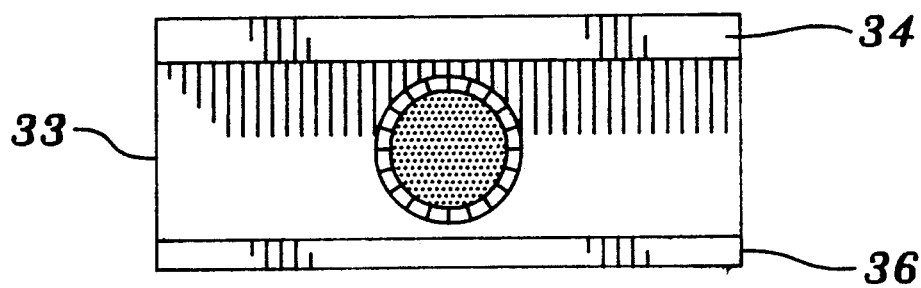
FIGS. 4D and 4E illustrate end and perspective views, respectively, of two optional grease shielding means of the present invention.
Figure 4E:
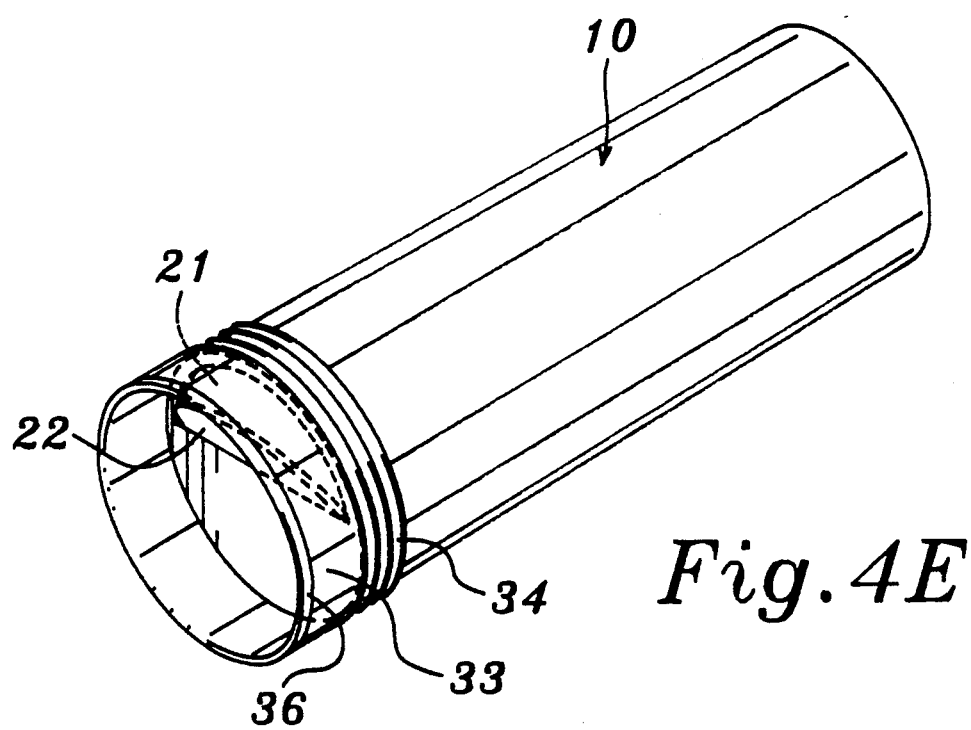

A third alternate device, grease fire shield 33, formed of heavy aluminum foil, with a hole in the center for fitting around a cartridge 10, is illustrated in FIGS. 4D and 4E. Grease or flame shield 33 can be slipped over the end of cartridge 10 and shaped appropriately forward in a funnel shape with the hands. An upper border 34 is formed of several folds of foil which may be unfolded for more height. A lower border 36 is provided for strength.

While a disposable model can be made of mild steel with a coating of tin, for instance, or aluminum or other materials, a refillable/reusable version is included in the embodiments of the present invention, which is preferentially made of a stronger material, such as stainless steel, for instance, and equipped with a replaceble cap, such as a twist-on, clip-on, or snap-on type. Thus, the user can have the advantages of the convenient container with the savings inherent in refilling the container with his own organic foodsmoking material if desired. Even the disposable model could be refilled, if desired, to a limited degree; until the flap breaks from bending or the thin container rusts or burns through, about seven to ten usages.

An angle adapter 25, for imparting an optimum height positioning angle to the cartridge 10, is illustrated in FIGS. 4A and 4B. Raising the open end 18 of the cartridge 10 three-quarters of an inch or more higher than the other end, either through the use of such an adapter 25 or by other means, assists in directing the smoke 26 out of the cartridge 10 and in preventing ignition of the material contained therein. For first time use, the customer must arrange a pie shaped wedge opening in the lava rock 16, in the central location depicted by FIG. 3B for smoker cartridge 10 placement. This is a one-time only requirement because thereafter new smoker cartridges are placed in the existing cavities where the spent smoker has rested. This wedge-shaped opening serves to hold the smoke producing end 18 higher. It is also important that the smoke-emitting end 18 of the cartridge 10 be placed at the center and within one to two inches from the front of the grill 12 in order to distribute the smoke evenly around the enclosure and thoroughly envelop the food.

Thus, it can be seen that there has been provided, for use on any and all, but especially gas, indoor and outdoor cooking devices known generally as barbecue grilles, a food-flavoring smoke producing cartridge, which is convenient, self-contained, ready-to-use, and easily disposed of or refilled. The long slim design of the preferred embodiment creates less heat disturbance for the cooking surface. Moreover, the wood chips do not need to be presoaked with the present invention. This food-smoker, which can be provided in multiple cartridge carriers, i.e., six-packs, contains smoke-producing particles or fragments of selected aromatic woods or other materials which are to be charred but not ignited when placed in contact with the heat-producing fuel of the barbecue grille. This smoking process imparts a desirable flavor to the food so treated. Being long and slim, the cartridge conducts heat more quickly throughout the mass of organic particles contained therein for prompt and efficient charring and smoking. If the device catches fire from a flame up or the like, it can be readily blown out or put out by splashing it with water. Once the smoldering process has begun, the smoking can continue without external heat, in the device that has sufficient draft holes in the bottom, such as that shown in FIG. 1B. In extremely large grills, a heat deflector shield made of thin sheet metal approximately three inches by four inches could be placed under the smoke emitting end. This would serve to reduce excessive heat to the smoker in hot grills. Elevation of the smoke discharging end also lessens the smoker's chance of catching fire because it keeps part of the wood chips and gases farther from direct heat than the other end. However, this lower end starts its smoking rapidly and progresses forward and upward, smoldering the remaining chips.

This design further provides a means whereby wood chips can be heated in the main cooking area while the smoke escapes from this main area where flame ups are likely to occur from dripping grease and extreme heat. This assists in preventing the smoke gases from igniting due to a spark or nearby flame. This steady upward stream of smoke within a grill has less chance of catching fire from surrounding grease fires and the extra distance from the extremely hot burner also reduces chances of smoke catching fire, where the device is used in a gas grill. This device helps to keep the highly flammable smoke and gases away from sparks and flame until the smoke has time to dispose and dilute with much less combustable air within the grilling area.

It is, of course, understood that although preferred embodiments of the present invention have been illustrated and described, various modifications thereof will become apparent to those with ordinary skill in the art and, accordingly, the scope of the present invention should be defined only by the appended claims and equivalents thereof.

I claim:

1. A smoke cartridge for containing flavored smoke-emitting material and for flavoring food by subjecting said smoke-emitting material to an externally applied heat-producing means, said cartridge comprising:

an elongated container for containing said smoke-emitting material, said container having a first end portion and a second end portion, and having sidewall means defining a bottom surface portion for being disposed toward said heat-producing means and an oppositely disposed top surface portion, said first end portion of said container including an end wall provided with at least one smoke-emitting opening;

whereby said top surface portion of said sidewall means serves as a grease shielding means for prohibiting grease from dripping into the smoke-emitting opening in said end wall of said container; and whereby said elongated container can be positioned such that said bottom surface portion proximate said second end portion is heated by said heat-producing means in order to heat said smoke-emitting material within said container to the point of emitting smoke, and such that said first end portion is displaced from said heat producing means so as to reduce the possibility of gases emitted by said smoke-emitting opening being ignited.

2. The smoke cartridge of claim 1 wherein said end wall of said container is recessed within said sidewall means such that a grease shielding lip is defined about said end wall so as to provide a further grease shielding means, whereby dripping grease is prohibited from contacting, and being ignited by, said smoke-emitting material.

3. The smoke cartridge of claim 1 wherein said cartridge is provided with further grease shield means including a sleeve for being received about said first end portion of said container, said sleeve defining an outboard end defining an opening for emitting smoke from said container, whereby dripping grease is prohibited from contacting, and being ignited by, said smoke-emitting material.

4. The smoke cartridge of claim 1 wherein said cartridge comprises further grease fire shielding means including an aluminum foil shield having an opening for receiving said first end portion of said container, whereby said foil shield can be selectively formed to shield said smoke-emitting opening from spattering or dripping grease such that spattering or dripping grease is prohibited from contacting, and being ignited by, said smoke-emitting material.

5. The smoke cartridge of claim 1 wherein said elongated container defines a longitudinal axis and wherein said container can be disposed during operation such that said longitudinal axis is inclined at an acute angle to horizontal with said first end portion elevated above said second end portion and such that said bottom surface portion is disposed toward said heat-producing means in order to heat said smoke-emitting material within said container to the point of emitting smoke, whereby the inclined disposition of said container facilitates emission of smoke produced by said smoke-emitting material from said container.

6. The smoke cartridge of claim 5 wherein said smoke cartridge is provided with support means for supporting said cartridge in an inclined position with respect to horizontal such that said first end portion is elevated relative to said second end portion.

7. The smoke cartridge of claim 6 wherein said support means comprises a frame having an end wall and having a pair of sidewalls disposed at opposite ends of said end wall of said frame for being positioned under and supporting said first end portion of said container in an elevated position, whereby said second end portion of said container is received between said sidewalls in an unelevated position.

8. The smoke cartridge of claim 1 wherein said smoke-emitting opening is provided with a closure for selectively opening and closing said smoke-emitting opening, whereby said container can be emptied and refilled with said smoke-emitting material after prior use and said smoke-emitting opening can be closed so as to retain said smoke-emitting material such that said cartridge is selectively refillable.

9. The smoke cartridge of claim 8 wherein said closure is provided with a pull tab for effecting the opening of said smoke-emitting opening.

10. A smoke cartridge for containing flavored smoke-emitting material and for flavoring food by subjecting said smoke-emitting material to an externally applied heat-producing means, said cartridge comprising:

an elongated container for containing said smoke-emitting material, said container having a first end portion and an second end portion, and having sidewall means extending therebetween, said sidewall means defining a bottom surface portion for being disposed toward said heat-producing means and an oppositely disposed top surface portion, said container being provided in said first end portion of said container with smoke-emitting means for allowing smoke to escape from said container and draft-producing means for allowing air to enter said container to increase smoke emission;

whereby said bottom surface portion is heated by said heat-producing means in order to heat said smoke-emitting material within said container to the point of emitting smoke; and whereby air is received in said draft-producing means at said first end portion of said container and said air combined with said smoke emitted by said smoke-emitting material is expelled through said smoke-emitting means in said first end portion of said container so as to facilitate the expulsion of said smoke from said container and reduce excessive heat buildup in said container.

11. The smoke cartridge of claim 10 wherein said elongated container defines a longitudinal axis and wherein said container can be disposed during operation such that said longitudinal axis is inclined at an acute angle to horizontal with said first end portion elevated relative to said second end portion and such that said bottom surface portion is disposed toward said heat-producing means in order to heat said smoke-emitting material within said container to the point of emitting smoke.

12. The smoke cartridge of claim 11 wherein said smoke cartridge is provided with support means for supporting said cartridge in an inclined position with respect to horizontal such that said first end portion is elevated relative to said second end portion.

13. The smoke cartridge of claim 12 wherein said support means comprises a frame having an end wall and having a pair of sidewalls disposed at opposite ends of said end wall of said frame for being positioned under and supporting said first end portion of said container in an elevated position, whereby said second end portion of said container is received between said sidewalls in an unelevated position.

14. The smoke cartridge of claim 10 wherein said container defines a cylindrical sidewall and wherein said smoke-emitting means defines a plurality of smoke-emitting openings provided in said first end portion and wherein said draft-producing means defines a plurality of a draft-producing openings in close proximity under said smoke emitting opening.

15. The smoke cartridge of claim 10 wherein said first end portion of said container defines a first end wall and said smoke-emitting means includes at least one smoke-emitting opening provided in said first end wall, and wherein said draft producing means includes a plurality of said draft-producing openings provided in said first end wall.

16. A smoke cartridge for containing flavored smoke-emitting material and for flavoring food by subjecting said smoke-emitting material to an externally applied heat-producing means, said cartridge comprising:
   an elongated cylindrical container for containing said smoke-emitting material, said container having a first end portion and a second end portion, and having a cylindrical sidewall extending therebetween, said cylindrical sidewall defining a bottom surface portion for being disposed toward said heat-producing means and an oppositely disposed top surface portion, said first end portion of said container including an end wall provided with at least one smoke-emitting opening;
   an extension tube having an inboard end portion defining an opening for slidably receiving said first end portion of said container and having an outboard end portion defining an further end wall defining a further smoke-emitting opening, whereby said smoke-emitting opening of said container is shielded from dripping grease and whereby the length of said cartridge can be selectively altered such that said second end portion of said container can be advantageously located with respect to said heat-producing means while said further smoke-emitting opening of said extension tube is selectively located for advantageous dispersal of said smoke; and
   whereby said bottom surface portion is heated by said heat-producing means in order to heat said smoke-emitting material within said container to the point of emitting smoke.

17. A smoke cartridge for containing flavored smoke-emitting material and for flavoring food by subjecting said smoke-emitting material to an externally applied heat-producing means, said cartridge comprising:
   an elongated cylindrical container for containing said smoke-emitting material, said container having a first end portion and an second end portion, and having a cylindrical sidewall extending therebetween, said cylindrical sidewall defining a bottom surface portion for being disposed toward said heat-producing means and an oppositely disposed top surface portion, said container being provided with a plurality of smoke-emitting openings in said top surface portion of said cylindrical sidewall proximate said first end portion of said container and a plurality of draft-producing opening in said bottom surface portion of said cylindrical sidewall proximate said second end portion of said container, said elongated container defining a longitudinal axis;
   whereby said container can be disposed during operation such that said longitudinal axis is inclined at an acute angle to horizontal with said first end portion disposed above said second end portion, and with said bottom surface portion being disposed toward said heat-producing means in order to heat said smoke-emitting material within said container to the point of emitting smoke; and
   whereby air is received in said draft-producing openings at said second end portion of said container and said air combined with said smoke emitted by said smoke-emitting material is expelled through said smoke-emitting openings in said first end portion of said container so as to facilitate the expulsion of said smoke from said container and slightly accelerate the charring process with a minimum of heat buildup in said container.

18. A smoke cartridge for containing flavored smoke-emitting material and for flavoring food by subjecting said smoke-emitting material to an externally applied heat-producing means, said cartridge comprising:
   an elongated cylindrical container for containing said smoke-emitting material, said container having a first end portion and an second end portion, and having a cylindrical sidewall extending therebetween, said cylindrical sidewall defining a bottom surface portion for being disposed toward said heat-producing means and an oppositely disposed top surface portion, said first end portion including an end wall provided with at least one smoke-emitting opening proximate said top surface portion of said cylindrical sidewall, said smoke-emitting opening being provided with closure means for selectively covering said smoke-emitting opening, said elongated container defining a longitudinal axis; and
   whereby said container can be disposed during operation such that said longitudinal axis is inclined at an acute angle to horizontal with said first end portion disposed above said first end portion, and with said bottom surface portion being disposed toward said heat-producing means in order to heat said smoke-emitting material within said container to the point of emitting smoke.

19. The smoke cartridge of claim 18 wherein said smoke-emitting opening occupies substantially the entire upper hemisphere of said end wall.

20. The smoke cartridge of claim 18 wherein said smoke-emitting opening defines an arcuate slot extending approximately 180 degrees proximate the outer perimeter of the upper hemisphere of said end wall.

* * * * *